Dec. 15, 1959   C. WEIDAUER ET AL   2,916,822
LEFT-HAND PINKING SHEARS
Filed March 31, 1959

INVENTORS.
Curt Weidauer
Roland Benner
BY Maxwell E. Sparrow
ATTORNEY

United States Patent Office

2,916,822
LEFT-HAND PINKING SHEARS

Curt Weidauer, Clinton Corners, N.Y., and Roland Benner, Teaneck, N.J., assignors to Samuel Briskman, New York, N.Y.

Application March 31, 1959, Serial No. 803,200

1 Claim. (Cl. 30—230)

This invention relates to pinking shears generally, including the serrated and scalloping types and more specifically relates to pinking shears which may be used by left-handed persons.

Heretofore, pinking shears were made for use with the right hand, that is, for right-handed persons, although a left-handed person could less efficiently use the same, encountering difficulty in its manipulation, since the directions of the applied forces or efforts during a shearing operation is reversed or the shearing force is reversed when a left-handed person uses a right-handed pair of shears.

For the efficient operation of a pair of shears, during a shearing or cutting operation, the shearing or cutting edges or flanges have to be so disposed or located on the blades and the blades have to be so relatively positioned that the shearing force or effort is toward the meeting of the blades. That is, the direction of the force or effort produced on one blade must be opposite to the direction of the force or effort produced on the other blade so that the shearing or cutting edges of the blades progressively come together during the shearing operation.

During a cutting or shearing operation, the force of the thumb of the hand tends to urge the handle which it engages in a direction away from the hand and thus to urge the connected blade inwardly, whereas the index and middle fingers of the hand tend to pull the other handle (which it engages) toward the hand and thus the latter blade in contact with the other blade, that is, during the cutting operation the blades progressively contact each other at the cutting edge from the pivoting point outwardly during the cutting operation.

When a conventional pair of shears, that is, one which is adapted for use by a right-handed person, is used the position of the blades, cutting shearing edges and handles are such that the aforementioned forces are reversed so that the blades instead of moving toward each other tend to separate.

It is quite evident that when a left-handed person uses a pair of shears adapted for use by a right-handed person, difficulty is usually encountered in properly manipulating the blades for the cutting operation.

In straight edge shears or scissors, an attempt has been made to relieve the discomfort of a right-hand shear for use by a left-handed person by providing a pair of shears wherein the openings of the gripping handles connected to the blades are reversed, that is, the contours of the thumb-engaging handle and index- and middle-finger engaging handle are reversed, the conventional respective positions and locations of the cutting or shearing edges and of the blades being maintained. However, this attempt cannot overcome the above-mentioned difficulty.

It is, therefore, an object of the present invention to provide a true or correct pair of shears for manipulation by a left-handed person, that is, by a person who is predominatingly left-handed.

It is a further object of the present invention to provide a pair of pinking shears wherein, when the shears are held with the handles pointed toward the user and the blades held in substantially vertical position for a cutting or shearing operation, the blade mounted on the right hand side of the pivot or axis joining the blades together will have its teeth disposed on the upper part or edge of the blade and the blade mounted on the left hand side of the said pivot or axis will have its inwardly-directed teeth disposed on the lower part or edge of the said latter blade; and wherein when viewing the inner face of each blade in horizontal position with the handles pointed toward the user, the curve of each tooth ridge runs from the leading end counterclockwise and outward.

It is customary in pinking or scalloping shears to provide one handle with a thumb-engaging opening and the other handle with a larger substantially ellipse opening to accommodate the index and middle fingers of the hand.

It is a still further object of the present invention to provide the first or former mentioned blade with the handle having the thumb-engaging opening and the second or latter mentioned blade with the index- and middle-finger engaging opening.

Another object of the present invention is to form and locate the handles on the respective blades such that the forces or pressure applied by the thumb, and the fingers of the left hand will always tend to bring the blades toward each other during the cutting operation.

The above and other objects and advantages of the invention will appear as the description proceeds, it being understood however, that it is not intended that the invention be limited to the exact details described herein which illustrates an example which may be obtained as a result of the knowledge gained through or gleaned from an understanding of the invention; and it is further intended that there be included as part of the invention all such obvious changes and modifications thereof as would occur to a person skilled in the art to which this invention pertains and as would fall within the scope of the claim herein.

Figure 1:
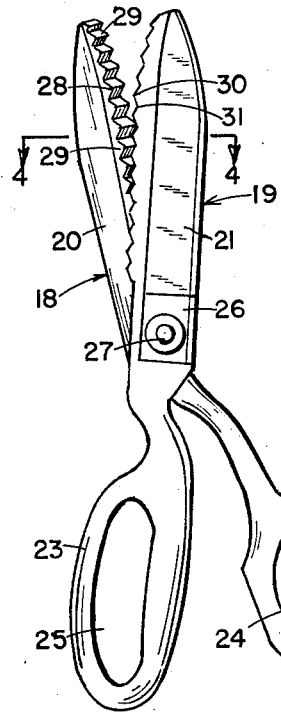
Fig. 1 is a perspective view of a pair of pinking shears with teeth or serrated cutting edges, according to the invention.
Figure 2:
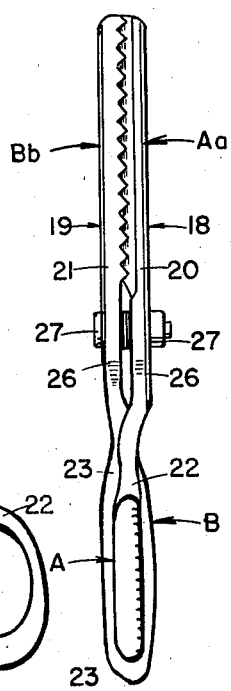
Fig. 2 is a top view of the shears in vertical operating position with thumb-engaging handle on top.
Figure 3:
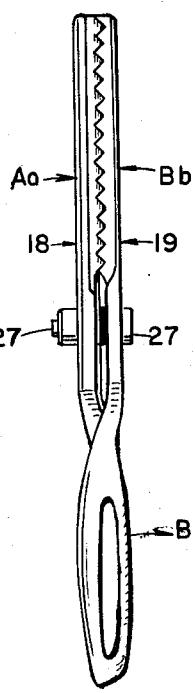
Fig. 3 is a view similar to Fig. 2 with the index- and middle-finger engaging handle on top.
Figure 4:
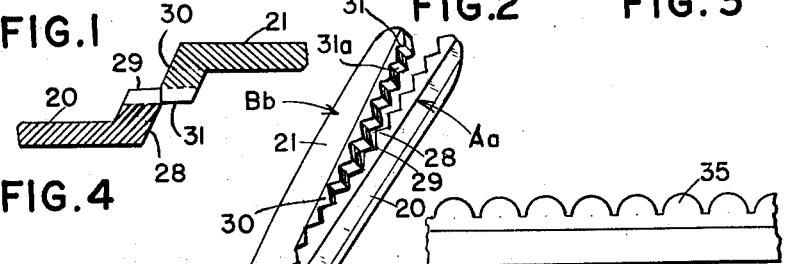
Fig. 4 is a detail sectional view in cross-section of the blades with the teeth of the cutting or shearing flanges in cutting engagement.

Referring now more particularly to the drawings, the pair of left-hand pinking shears comprises blades 20, 21 to which are connected the corresponding operating handles 22, 23, handle 22 having the thumb-opening 24 and handle 23 having the fingers-opening 25. Intermediate each blade 20, 21 and corresponding handle 22, 23 is a portion 26 providing a flat working or bearing surface for the blades where the two blades are pivotally connected to form a pair of shears. The portions 26 are provided with registering openings receiving the bolt or pin 27, which bolt or pin provides the means for pivotally connecting the blades together to form the shears. Blade 20 has formed on its facing side an inwardly extending cutting or shearing flange 28 having formed or milled therein zigzag teeth 29 each having a ridge 29a and blade 21 has formed on its facing side an inwardly extending cutting or shearing flange or ridge 30 having formed or milled therein zigzag teeth 31 each having a ridge 31a and being complementary and cooperating to produce a zigzag cut when the shears are operated. Each tooth 29, 31 is transversely curved from its leading end L to its trailing end T (Fig. 5a) substantially concentric with the axis or pivot 27.

Figure 6:
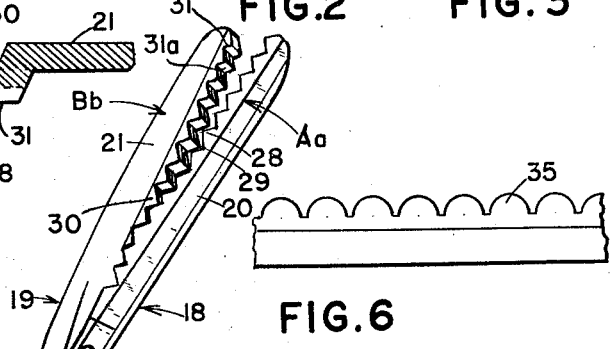
Fig. 6 is a fragmentary view of a scallop cutting edge of a pinking shear.

The pinking teeth 29 and 31 are shown in Figs. 1 to 5 as being zigzag or serrated. However, it is to be understood that the teeth may be of any form or shape, for example, they may be in the form of scallops 35 as seen in Fig. 6.

Figure 5:
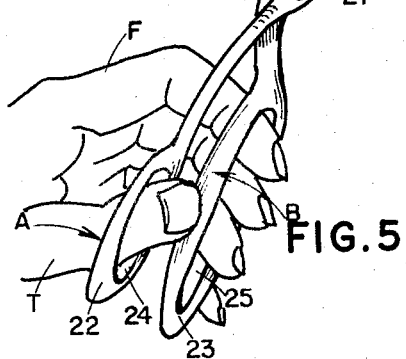
Fig. 5 is a perspective view of the shears during a cutting operation.

Fig. 5 shows the shears in an operative position. In the production of a true pair of left-hand shears, it is essential that the blade 20 connected to the thumb-engaging handle 22 shall be located to the right or forward of the other blade 21 connected to handle 23 when the shears are held in said operative position. The inwardly directed flange 28 having the teeth 29 is then located on the upper side of the inner face of blade 20, and the inwardly directed flange 30 having the teeth 31 is then located on the lower side of the inner face of blade 21.

Thus, when shears according to the invention is being operated with the left hand, the blades being pivoted at 27, the thumb-engaging handle 22 will be pushed by the thumb T in the direction of the arrow A urging the connecting blade 20 ahead of pivot 27, to move in the opposite direction as indicated by the arrow Aa; at the same time the finger-engaging handle 23 will be pulled by the fingers F in the direction of the arrow B urging the connecting blade 21 ahead of the pivot or axis 27, to move in the opposite direction, as indicated by the arrow Bb.

Figure 5A:
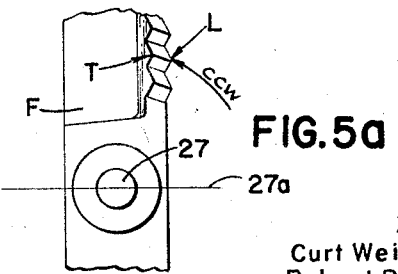
Fig. 5a is a plan view on an enlarged scale of a portion of a shear blade looking at its inner face.

As seen in Figs. 5 and 5a, the teeth are located to the right of said axis and the leading end L of each tooth is located closer to a line drawn through said axis at right angles to the blade than its trailing end T, and the curve of each tooth ridge runs from said leading end L counterclockwise and outward when viewing the inner face of the blade in horizontal position with the handles pointed toward the user as seen in Fig. 5. In Fig. 5a, counterclockwise direction is indicated by the letters "CCW."

By the provision of a left-hand pair of shears according to the invention, the facing toothed flanges 28, 30 on the opposite substantially longitudinal edges thereof are adapted to have the transverse extending teeth 29, 31 cooperate to produce the desired cut efficiently and with little effort comparable to a right-hand pair of shears used with the right hand.

It is to be understood that where the terms "pinking shears" and "teeth" are used in the specification and/or the claim, it is intended that the same shall include shears having tooth portions for forming cuts of scalloped, serrated, undulated or the like. Also, the handles 22 and 23 and/or openings 24, 25 may have the same or different shapes.

From the foregoing it is evident that there has been provided by the invention left-hand pinking shears comprising a body 18 having a thumb-engaging handle 22 and a blade 20 extending therefrom, a body 19 having a finger-engaging handle 23 and a blade 21 extending therefrom, bodies 18, 19 being pivotally connected for rotation about a common axis 27, each of blades 20, 21 having a flange extending along its inner face F and at the right-hand side thereof when viewing said face with the handles pointing toward the user or viewer (Fig. 5a), blade 20 which extends from the thumb-engaging handle 22 being disposed at the right-hand side of axis 27 when the shears are positioned with axis 27 in substantially horizontal position and thumb-engaging handle 22 uppermost pointing toward the user or viewer (Fig. 5), flanges 28, 30 having transversely extending cooperating teeth 29, 31, each tooth on both flanges being transversely curved substantially concentric with axis 27, the ridge of each tooth having its leading end L located closer to the line 27a drawn through axis 27 at right angles to the blade than its trailing end T and the curve of each tooth ridge running from leading end L counterclockwise and outward when viewing the inner face F of each blade in horizontal position with the handles 22, 23 pointing toward the user or viewer.

Although the drawings and the above specification disclose the best mode in which we have contemplated embodying our invention, we desire in no way to be limited to details of such disclosures, for in the further practical application of our invention many changes in the form and proportion may be made as circumstances require or experience suggests without departing from the spirit of the invention within the scope of the appended claim.

We claim:

Left-hand pinking shears comprising a pair of bodies, one of said bodies having a thumb-engaging handle and a blade extending therefrom and the other of said bodies having a finger-engaging handle and a blade extending therefrom, means pivotally connecting said bodies for rotation about a common axis, each of said blades having a flange extending along its inner face and at the right-hand side thereof when viewing said face with said handles pointing toward the viewer, said blade which extends from said thumb-engaging handle being disposed at the right-hand side of said axis when the shears are positioned with said axis in substantially horizontal position and the thumb-engaging handle uppermost pointing toward the viewer, said flanges having transversely extending cooperating teeth, each of said teeth on both flanges being transversely curved substantially concentric with said axis, the ridge of each tooth having its leading end located closer to a line drawn through said axis at right angles to the blade than its trailing end and the curve of each tooth ridge running from said leading end counterclockwise and outward when viewing the inner face of each blade in horizontal position with said handles pointing toward the viewer.

References Cited in the file of this patent

UNITED STATES PATENTS

| | | |
|---|---|---|
| 2,676,402 | Shaler | Apr. 27, 1954 |
| 2,850,803 | Briskman | Sept. 9, 1958 |